(12) United States Patent
Shin

(10) Patent No.: US 8,355,084 B2
(45) Date of Patent: Jan. 15, 2013

(54) METHODS OF GENERATING A PIXEL CLOCK SIGNAL FROM A TRANSMISSION CLOCK SIGNAL AND RELATED DATA TRANSMISSION METHODS FOR MULTIMEDIA SOURCES

(75) Inventor: Jongshin Shin, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 546 days.

(21) Appl. No.: 12/575,523

(22) Filed: Oct. 8, 2009

(65) Prior Publication Data

US 2010/0097527 A1    Apr. 22, 2010

(30) Foreign Application Priority Data

Oct. 16, 2008 (KR) .................. 10-2008-0101611

(51) Int. Cl.
  *H04N 5/38* (2006.01)
(52) U.S. Cl. .................. 348/723; 348/512; 348/537
(58) Field of Classification Search .......... 348/515, 348/537, 500, 512, 552, 725, 738, 423.1, 348/473, 478, 465, 477, 723; 375/240.28, 375/365–366, 244, 219, 240.26; *H04N 5/38*
See application file for complete search history.

(56) References Cited

U.S. PATENT DOCUMENTS

| | | | |
|---|---|---|---|
| 7,088,398 B1 | 8/2006 | Wolf et al. | |
| 7,667,544 B2 * | 2/2010 | Sugawara et al. | 331/1 A |
| 8,063,986 B2 * | 11/2011 | Wang | 348/515 |
| 2002/0163598 A1 * | 11/2002 | Pasqualino | 348/725 |
| 2007/0291856 A1 | 12/2007 | Fastert et al. | |

FOREIGN PATENT DOCUMENTS

| | | |
|---|---|---|
| JP | 2002-200784 | 7/2002 |
| KR | 1020070090541 A | 9/2007 |

\* cited by examiner

*Primary Examiner* — Trang U Tran
(74) *Attorney, Agent, or Firm* — Myers Bigel Sibley & Sajovec

(57) ABSTRACT

Methods of generating a pixel clock signal for a multimedia source are provided in which a transmission clock signal having a first frequency is generated from a reference clock signal that has a second frequency. The generated transmission clock signal is multiplied by a multiple to generate the pixel clock signal. The pixel clock signal has a third frequency that is the product of the second frequency and the multiple.

19 Claims, 6 Drawing Sheets

METHODS OF GENERATING A PIXEL CLOCK SIGNAL FROM A TRANSMISSION CLOCK SIGNAL AND RELATED DATA TRANSMISSION METHODS FOR MULTIMEDIA SOURCES

PRIORITY STATEMENT

This application claims priority under 35 U.S.C §119 to Korean Patent Application No. 2008-101611, filed on Oct. 16, 2008, in the Korean Intellectual Property Office, the entire contents of which are incorporated by reference as if set forth fully herein.

BACKGROUND

The present invention relates to methods of generating clock signals and, more particularly, to methods of generating clock signals for a multimedia source and related data transmission methods.

A typical multimedia system includes a multimedia source that provides a multimedia signal such as, for example, a DVD player or a set-top box, and a multimedia output/display device such as, for example, a television, that outputs a multimedia signal that is provided from the multimedia source. An interface is used to transmit and receive data between the multimedia source and the multimedia output device. Two interface protocols that have been recently adopted are the High Definition Multimedia Interface (HDMI) and the Digital Video Interface (DVI). A cable converter may be used to convert between DVI and HDMI, thereby allowing, for example, a connection between a DVI multimedia source and an HDMI multimedia output device.

A Transition Minimized Differential Signaling (TMDS) method may be used to transmit data between a multimedia source and a multimedia output device when HDMI or DVI are used. The TMDS method includes a video data period, a data island period, and a control period. Active video data is transmitted during the video data period. Packets of audio information and supplementary data are transmitted during the data island period. Preamble data is transmitted during the control period.

SUMMARY

Pursuant to embodiments of the present invention, methods of transmitting data from a multimedia source are provided in which a transmission clock signal that has a first frequency is generated by multiplying a reference clock signal that has a second frequency that is different than the first frequency. The generated transmission clock signal is multiplied to generate a pixel clock signal that has a third frequency that is different than the first and second frequencies. The transmission clock signal is output from the multimedia source at the time serial data of the multimedia source is transmitted.

In some embodiments of these methods, the transmission clock signal may be generated by multiplying a reference clock signal using a phase-locked loop or a delay-locked loop to generate an intermediate clock signal having a fourth frequency and then dividing the intermediate clock signal having the fourth frequency by five to generate the transmission clock signal. The method may also include latching parallel data of the multimedia source to generate the serial data at a rising or a falling point of the intermediate clock signal. In some embodiments, the third frequency of the pixel clock signal may be 1, ⅘, ⅔ or ½ the first frequency of the transmission clock signal. In some embodiments, the duty error of the pixel clock signal may be correctable.

In one specific embodiment, the third frequency of the pixel clock signal may be ⅘ the first frequency of the transmission clock signal, and this pixel clock signal may be generated by passing the transmission clock signal through a divider that divides by a factor of five and then passing the output of the divider through a first frequency doubler and then passing the output of the first frequency doubler through a second frequency doubler. In another specific embodiment, the third frequency of the pixel clock signal may be ⅔ the first frequency of the transmission clock signal, and this pixel clock signal may be generated by passing the transmission clock signal through a divider the divides by a factor of three and then passing the output of the divider through a frequency doubler. In yet another specific embodiment, the third frequency of the pixel clock signal may be ½ the first frequency of the transmission clock signal, and this pixel clock signal may be generated by passing the transmission clock signal through a divider that divides by a factor of two. In some embodiments, the multimedia source may generate a plurality of pixel clock signals, and one of this plurality of pixel clock signals may be selected for use by the multimedia source based on a color depth of the data of the multimedia source.

Pursuant to further embodiments of the present invention, methods of transmitting data of a multimedia source are provided in which a reference clock signal having a first frequency is multiplied to generate a transmission clock signal having a second frequency. The generated transmission clock signal is multiplied to generate a pixel clock signal having a third frequency. Parallel data is then converted into serial data in synchronization with the generated pixel clock signal. The serial data and the transmission clock signal are then transmitted to an external device.

Pursuant to still further embodiments of the present invention, methods of generating a pixel clock signal for a multimedia source are provided in which a transmission clock signal having a first frequency is generated from a reference clock signal that has a second frequency that is different than the first frequency. The generated transmission clock signal is multiplied by a multiple to generate the pixel clock signal that has a third frequency that is the product of the second frequency and the multiple.

In some embodiments, the transmission clock signal may be multiplied by the multiple to generate the pixel clock signal by passing the transmission clock signal through at least two multiplier and/or divider circuits to generate the pixel clock signal. Moreover, the transmission clock signal may be passed through a first multiplication path that includes at least one multiplier and/or divider circuit to generate a first potential pixel clock signal and passed through a second multiplication path that includes at least one multiplier and/or divider circuit to generate a second potential pixel clock signal. In such embodiments, the pixel clock signal may be generated by selecting one of the first potential pixel clock signal and the second potential pixel clock signal as the pixel clock signal based on a color depth of video data that is to be transmitted by the multimedia source.

In some embodiments, a single phase locked loop or delay locked loop is used to generate the pixel clock signal from the reference clock signal. Moreover, generating the transmission clock signal having the first frequency from the reference clock signal that has the second frequency may involve multiplying the reference clock signal using a multiplication unit to generate an intermediate clock signal and then dividing the intermediate clock signal using a divider to generate the transmission clock signal. In such embodiments, the single phase locked loop or delay locked loop may be part of the multiplication unit.

In another exemplary embodiment, a method of transmitting data of a multimedia source may comprise: multiplying a frequency of a reference clock to generate a transmission clock; dividing or multiplying a frequency of the generated transmission clock to generate a pixel clock; converting parallel data in synchronization of the pixel clock into serial data; and transmitting the serial data and the transmission clock to an external source.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention. In the drawings.

DETAILED DESCRIPTION

Figure 1:
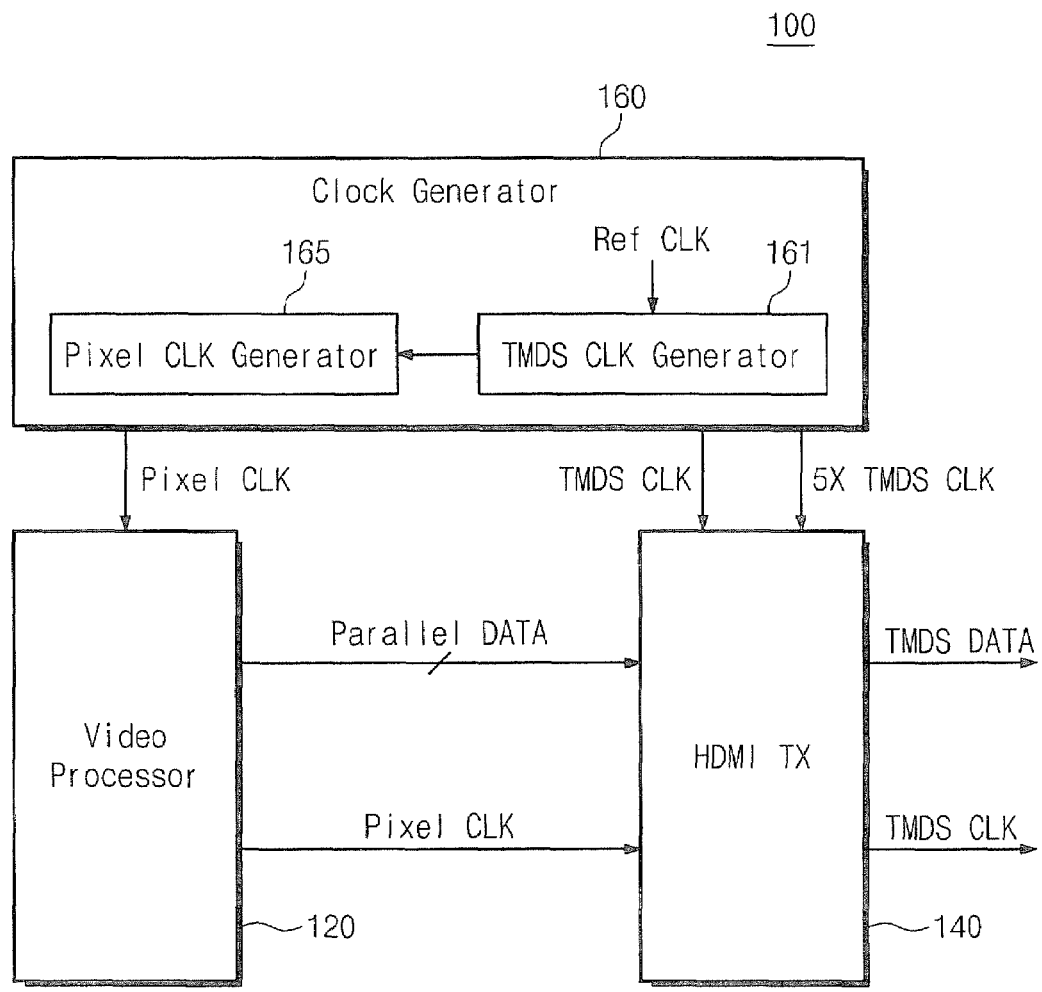
FIG. 1 is a block diagram of a multimedia source according to certain embodiments of the present invention.

The present invention will now be described more fully hereinafter with reference to the accompanying drawings, in which embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like numbers refer to like elements throughout the accompanying figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

Multimedia sources according to embodiments of the present invention may generate a transmission clock signal and may then generate a pixel clock signal by dividing or multiplying the generated transmission clock signal. Accordingly, the multimedia sources according to some embodiments of the present invention may use fewer phase-locked loops (PLL) for clock signal generation purposes as compared to conventional multimedia sources.

FIG. 1 depicts a multimedia source 100 according to certain embodiments of the present invention. As shown in FIG. 1, the multimedia source 100 includes a video processor 120, a transmitter 140, and a clock generator 160. The clock generator 160 includes a pixel clock generator 165 that is configured to generate a pixel clock signal Pixel CLK from a transmission clock signal TMDS CLK. The multimedia source 100 depicted in FIG. 1 may comprise, for example, a television, a DVD player or a set-top box.

The transmitter 140 that is depicted in FIG. 1 is an HDMI transmitter. However, it will be appreciated that other types of transmitters may be used. Thus, for example, any transmitter may be used that has an output transmission clock signal TMDS CLK that has a frequency that is greater than the frequency of the generated pixel clock signal Pixel CLK.

The video processor 120 controls operations for transmitting image data to an external device. The video processor 120 outputs parallel data in synchronization with the pixel clock signal Pixel CLK. In other words, the frequencies of the pixel clock signal and the parallel data are identical. The parallel data may include R-pixel data, G-pixel data and B-pixel data (i.e., red-green-blue pixel data). The video processor 100 may compress the image data that is to be transmitted using, for example, Moving Picture Experts Group (MEPG), Joint Photographic Experts Group (JPEG), or other data compression methods.

The pixel clock signal Pixel CLK is input from the pixel clock generator 165 of the clock generator 160. The pixel clock signal Pixel CLK is used as a digital clock of a link logic (not shown) or of the video processor 120.

The transmitter 140 receives the parallel data and the pixel clock signal Pixel CLK that are output from the video processor 120, and further receives the transmission clock signal TMDS CLK and another clock signal 5×TMDS CLK that has a frequency which is five times the frequency transmission clock signal TMDS CLK from the clock generator 160. The transmitter 140 latches the parallel data at a rising or a polling point of the 5×TMDS CLK signal. The transmitter 140 outputs serial data TMDS DATA and the transmission clock signal TMDS CLK. The frequency of the transmission clock signal TMDS CLK is ten times the frequency of the serial data TMDS DATA. Although not shown, the transmission clock signal TMDS CLK and the serial data TMDS DATA may be transmitted as differential signals.

The clock generator 160 includes the transmission clock generator 161 and the pixel clock generator 165. The transmission clock generator 161 may generate the transmission clock signal TMDS CLK by multiplying a reference clock signal RefCLK. The pixel clock generator 165 may generates the pixel clock signal Pixel CLK by multiplying or dividing the transmission clock signal TMDS CLK that is generated by the transmission clock generator 161 and input to the pixel clock generator 165.

In a typical multimedia source, two or three PLLs may be used to support use of deep colors. For example, one PLL may be used to generate a pixel clock signal, one PLL may be used to generate a transmission clock signal, and another PLL may be used to resolve jitter that may occur between the pixel clock signal and the transmission clock signal. However, the number of PLLs may impact both the size and/or the power requirements of the multimedia source. Also signal interference may occur between the PLLs.

Pursuant to embodiments of the present invention, multimedia sources are provided that may use reduced numbers of PLLs. For example, the multimedia source 100 may use a single PLL to support the use of deep color. The multimedia source 100 initially generates the transmission clock signal, and then generates the pixel clock signal from the transmission clock signal. The pixel clock signal may be generated by multiplying the transmission clock signal by one or more multipliers (note that herein the term "multiplying encompasses both multiplication and division operations, as a division operation may be viewed as a multiplication operation with a multiplier having a value that is less than 1). As such, the multimedia source 100 may include a single PLL that is used to generate the transmission clock signal TMDS CLK.

Figure 2:
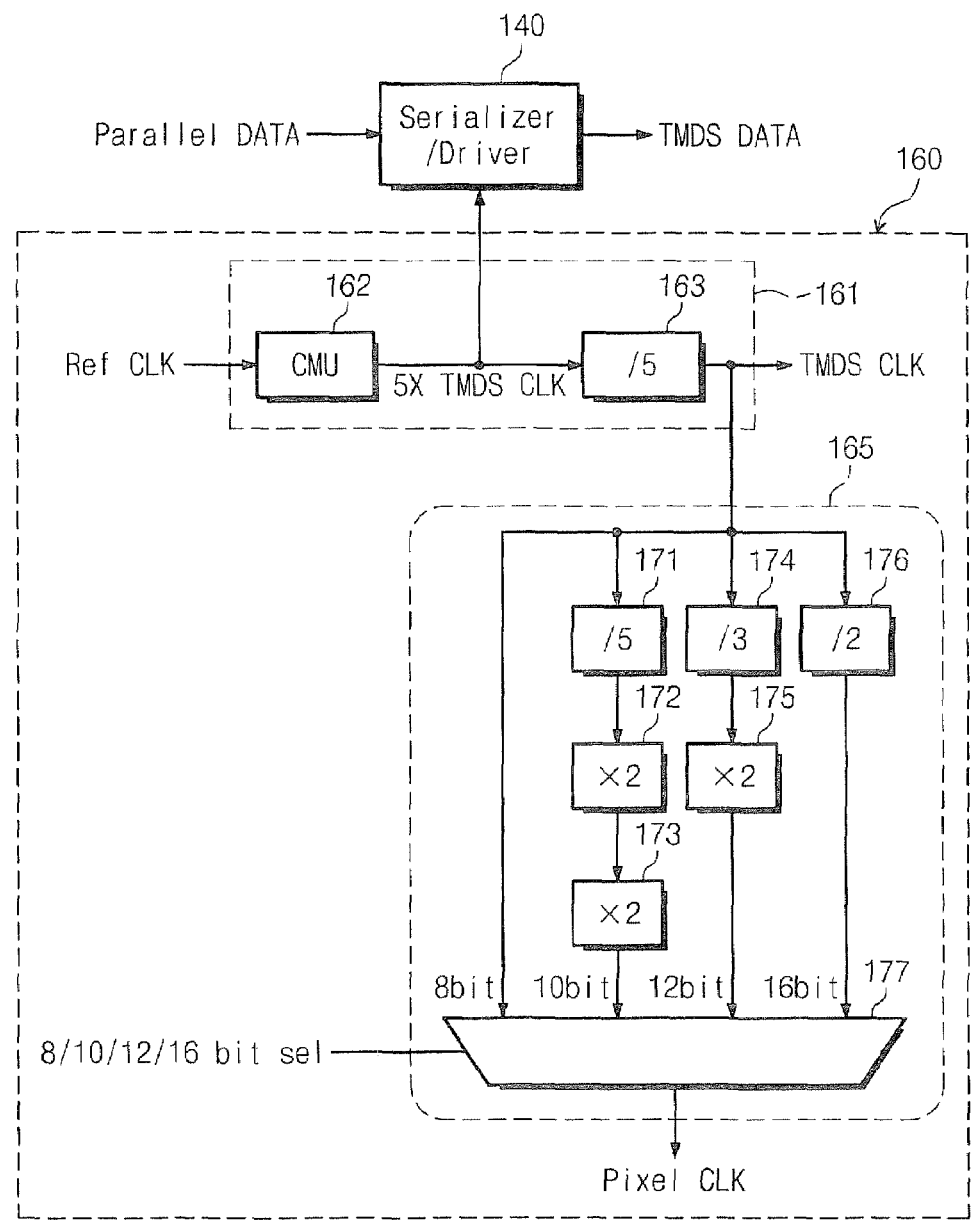
FIG. 2 is a block diagram of a first embodiment of the clock generator of FIG. 1.

FIG. 2 illustrates a first embodiment of the clock generator 160 of FIG. 1. In FIG. 2, the clock generator 160 includes a transmission clock generator 161 and a pixel clock generator 165.

The transmission clock generator 161 includes a clock multiplication unit CMU 162 and a divider 163. The clock multiplication unit 162 receives the reference clock signal RefCLK which it uses to generate the clock signal 5×TMDS CLK that has a frequency that is five times the frequency of the transmission clock signal TMDS CLK. The clock signal 5×TMDS CLK is used to convert parallel data into serial transmission data. The divider 163 divides the frequency of the clock signal 5×TMDS CLK by five to generate the transmission clock signal TMDS CLK. The reference clock signal RefCLK may be obtained, for example, from a highly precise crystal oscillator.

The clock multiplication unit 162 includes a PLL or a delay locked loop DLL. A clock multiplication unit 162 that includes a PLL uses a phase frequency detector to detect a phase/frequency difference between the divider clocks. The divider clocks correspond to the clock that divides frequencies of input clock and output clock by N. The clock multiplication unit controls the frequency of the output clock based on the detected phase/frequency difference between the divider clocks. A clock multiplication unit that uses a DLL uses the phase frequency detector to detect the phase/frequency difference between the input clock and the output clock, and controls delay between a plurality of delay cells included in delay lines, based on the detected result.

The pixel clock generator 165 multiplies the transmission clock signal TMDS CLK to generate a plurality of pixel clock signals, and selects one of the generated pixel clock signals based on the color depth. Herein, the "color depth" refers to the number of bits that are used to store color information. For example, if a color depth of a G-pixel is 10 bits, 10 bits are used to store color information of the G-pixel.

In the particular embodiment of the clock generator 160 depicted in FIG. 2, the pixel clock generator 165 includes dividers 171, 174, 176, frequency doublers 172, 173, 175, and a multiplexer 177. The dividers 171, 174, 176 and the frequency doublers 172, 173, 175 are each "multipliers" as they take an input clock signal having a first frequency and output a clock signal having a second frequency that is an integer or non-integer multiple of the first frequency. In particular, the dividers 171, 174 and 176 generate clock signals having a frequency equal to the frequency of an input clock signal that is divided by a predetermined number (here 5, 3 and 2, respectively for dividers 171, 174 and 176). The frequency doublers 172, 173, and 175 generate clock signals having a frequency which is twice the frequency of an input clock signal. The dividers 171, 174 and 175 and the frequency doublers 172, 173 and 175 do not use PLLs or DLLs.

The color depths are subject to change according to the ratio of the frequencies of the transmission clock signal TMDS CLK and the pixel clock signal Pixel CLK. For example, when the color depth is 8-bits, the ratio is 1:1, when the color depth is 10-bits, the ratio is 1.25:1, when the color depth is 12-bits, the ratio is 1.5:1, and when the color depth is 16-bits, the ratio is 2:1. Accordingly, when the transmission clock signal TMDS CLK is multiplied by 1, ⅘, ⅔ and ½, respectively, pixel clock signals Pixel CLK of 8, 10, 12, and 16 bits are obtained.

A clock signal having a frequency which is ⅘ the frequency of the transmission clock signal TMDS CLK may be generated by passing the clock signal TMDS CLK through the divider 171 which divides the frequency of the clock signal TMDS CLK by five. The clock signal at the output of the divider 171 is passed through the frequency doublers 172 and 173, each of which multiply the clock frequency by two. A clock signal having a frequency which is ⅔ the frequency of the transmission clock signal TMDS CLK may be generated by passing the clock signal TMDS CLK through the divider 174 which divides the frequency of the clock signal TMDS CLK by three, and then passing the output of divider 174 through the frequency doubler 175 which multiplies the clock frequency by two. A clock signal having a frequency which is ½ the frequency of the transmission clock signal TMDS CLK may be generated by passing the clock signal TMDS CLK through the divider 176 which multiplies the clock frequency by two. The multiplexer 177 selects one of the transmission clock signal TMDS CLK, the clock signal having a frequency that is ⅘ the frequency of the transmission clock signal, the clock signal having a frequency that is ⅔ the frequency of the transmission clock signal, and the clock signal having a frequency that is ½ the frequency of the transmission clock signal, according to the color depth, and then outputs one of these clock signals as the pixel clock signal Pixel CLK.

The frequency doublers 172, 173 and 175 may include duty cycle corrector circuits (DCC). These DCCs correct a duty cycle of the clock signal to a predetermined value, and maintain the duty cycle of the clock signal at this predetermined value. The "duty" of a clock signal refers to the ratio between the period when the clock signal is at a logical high state and the period when the clock signal is at a logical low state. For example, if the periods of the logical high state and the logical low state are identical, the duty is 50%.

The clock generator 160 of FIG. 2 selects a pixel clock signal based on the color depth of the multimedia source. However, the clock generators according to embodiments of the present invention are not limited to selecting the pixel clock signal.

Figure 3:
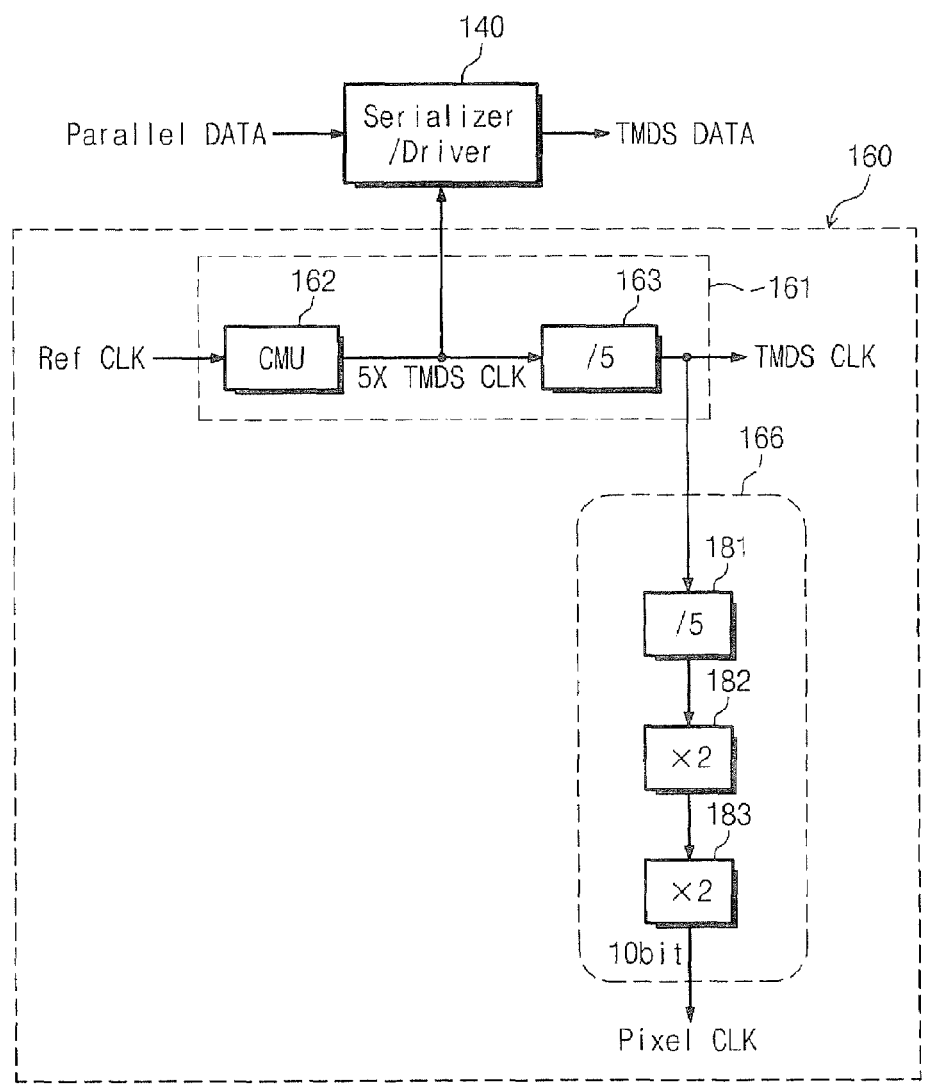
FIG. 3 is a block diagram of a second embodiment of the clock generator of FIG. 1.

FIG. 3 illustrates a second embodiment of the clock generator 160 of FIG. 1. As shown in FIG. 3, the clock generator 160 includes the transmission clock generator 161 that is discussed above with reference to FIG. 2 and a pixel clock generator 166. The pixel clock generator 166 includes a divider 181 and multipliers 182 and 183. The divider 181 divides the transmission clock signal TMDS CLK by five to provide a clock signal having a frequency that is one fifth the frequency of the transmission clock signal TMDS CLK. The multipliers 182 and 183 each multiply the frequency of the signals input thereto by two. Thus, together, the divider 181 and the multipliers 182 and 183 may be used to provide a pixel clock signal having a frequency that is 4/5 the frequency of the transmission clock signal TMDS CLK.

Figure 4:
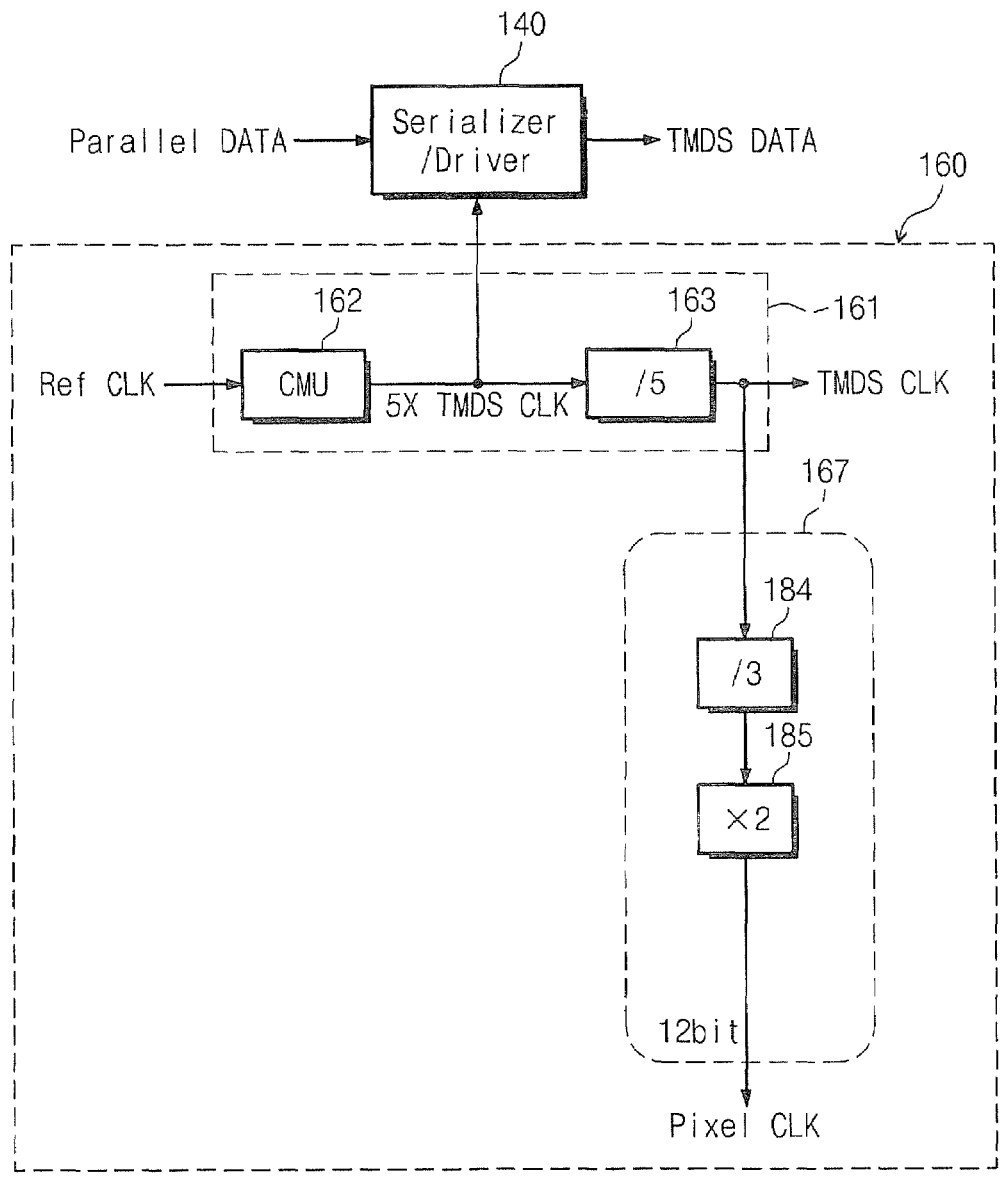
FIG. 4 is a block diagram of a third embodiment of the clock generator of FIG. 1.

FIG. 4 illustrates a third embodiment of the clock generator 160 of FIG. 1. As shown in FIG. 4, the clock generator 160 includes the transmission clock generator 161 and a pixel clock generator 167. The pixel clock generator 167 includes a divider 184 and a multiplier 185. The divider 184 divides the transmission clock signal TMDS CLK by three to provide a clock signal having a frequency that is one third the frequency of the transmission clock signal TMDS CLK. The multiplier 185 multiplies the clock signal input thereto by two. Together, the divider 184 and the multiplier 185 may be used to provide a pixel clock signal having a frequency that is 2/3 the frequency of the transmission clock signal TMDS CLK.

Figure 5:
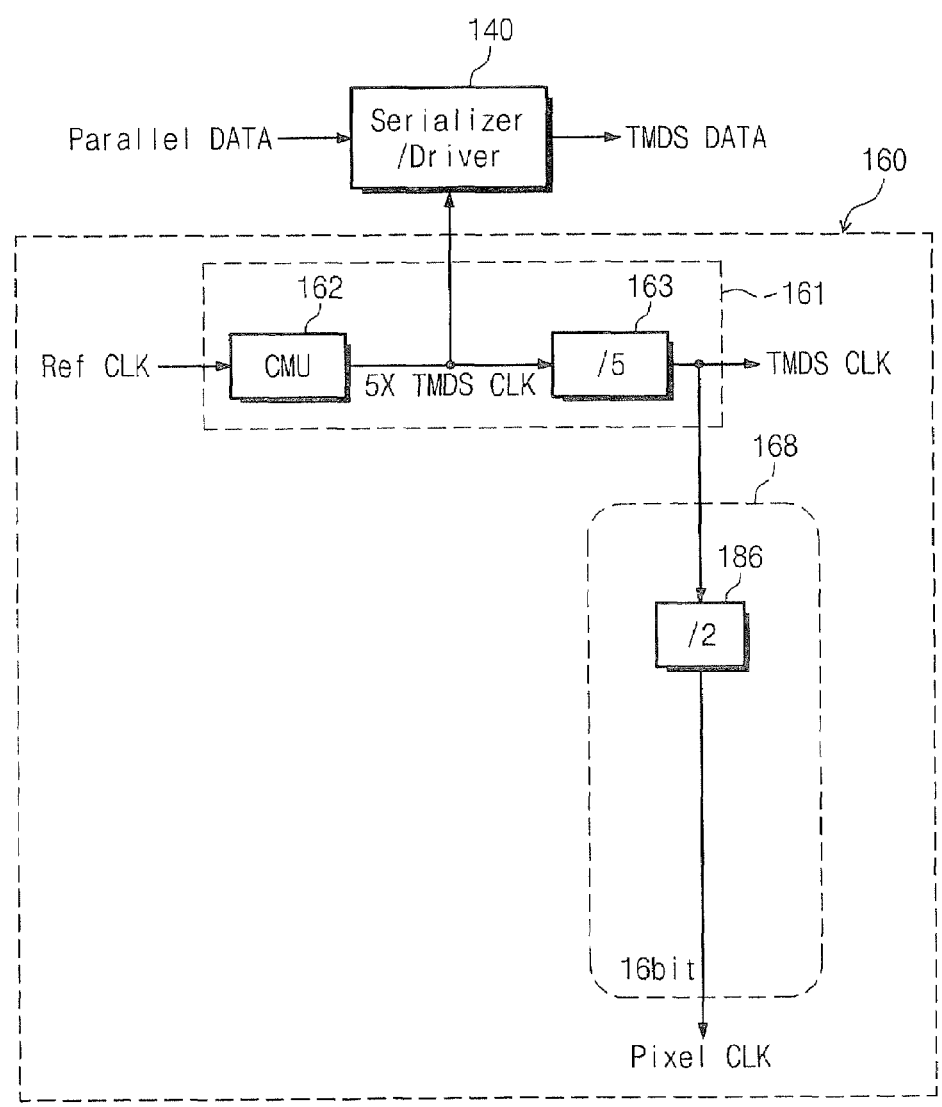
FIG. 5 is a block diagram of a fourth embodiment of the clock generator of FIG. 1.

FIG. 5 illustrates a fourth embodiment of the clock generator 160 of FIG. 1. As shown in FIG. 5, the clock generator 160 includes the transmission clock generator 161 and a pixel clock generator 168. The pixel clock generator 168 includes a divider 186 that divides the input clock signal TMDS CLK by two to provide a pixel clock signal having a frequency that is ½ the frequency of the transmission clock signal TMDS CLK.

Figure 6:
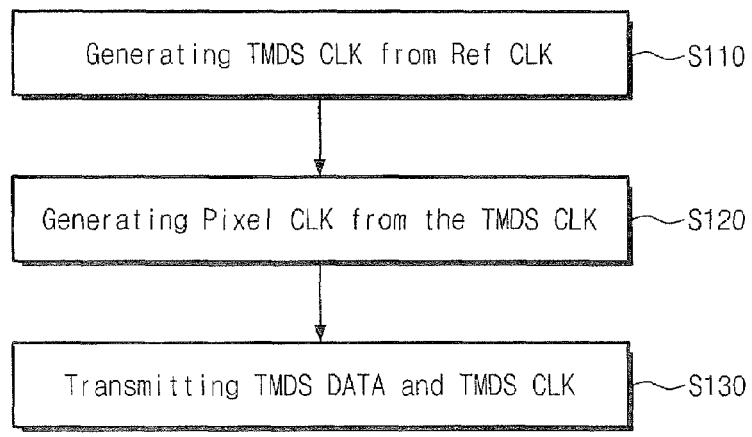
FIG. 6 is a flow chart illustrating a method of transmitting multimedia data according to embodiments of the present invention.

FIG. 6 is a flow chart illustrating a method of transmitting multimedia data according to embodiments of the present invention. Referring to FIG. 1 and FIG. 6, the data transmitting method of this embodiment may proceed as follows.

When transmitting data of multimedia source, a clock generator such as the clock generator 160 of FIG. 1 generates a transmission clock signal TLDS CLK from a reference clock signal Ref CLK (S110). The transmission clock signal TMDS CLK may be generated using a PLL to provide a precise clock signal.

The clock generator 160 uses the transmission clock signal TMDS CLK to generate a pixel clock signal Pixel CLK (S120). The pixel clock signal Pixel CLK may be generated by multiplying or dividing the transmission clock signal TMDS CLK. The multiplication and division operations that are performed may be selected based on the color depth of the multimedia source. For example, when the color depth of the multimedia source is 10 bits, a pixel clock signal Pixel CLK that has a frequency that is 4/5 the frequency of the transmission clock signal TMDS CLK may be used as the pixel clock signal Pixel CLK.

The transmitter 140 receives parallel data based on color depth, and latches data at a rising point and a falling point of the clock signal 5×TMDS CLK to generate serial transmission data TMDS DATA. The transmitter 140 outputs the transmission data TMDS DATA and the transmission clock TMDS CLK thus generated (S130).

Figure 7:
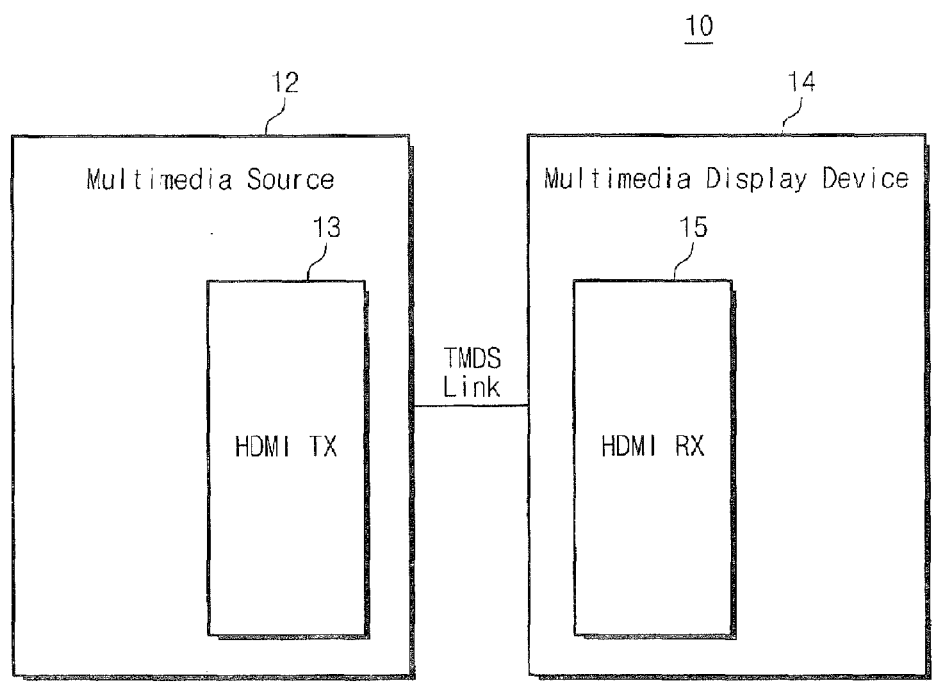
FIG. 7 is a block diagram of a multimedia system having a multimedia source according to certain embodiments of the present invention.

FIG. 7 illustrates a multimedia system 10 having a multimedia source according to certain embodiments of the present invention. As shown in FIG. 7, the multimedia system 10 includes a multimedia source 12 and a multimedia output device 14 (e.g., a display device). The multimedia source 12 may be configured identically to the multimedia source 100 of FIG. 1. The multimedia source 12 includes a transmitter 13 that switches parallel image data into high-speed serial data.

The multimedia output device 14 includes a receiver 15 that is configured to receive high-speed serial data transmitted from the multimedia source 12. The multimedia output device 14 includes a device (not shown) which converts input serial image data and outputs the converted data. The multimedia output device 14 may be, for example, a television set, a PDA, a cellular telephone, or a navigation system.

The multimedia source 12 and the multimedia output device 14 may be connected by a TMDS link that may support high-speed data transmission. This TMDS link may have the characteristics described below.

Video data (e.g., each 8-bit digital video data word) and other information is encoded (e.g., into a 10-bit encoded word) prior to transmission. The encoder generates "out-of-band" words in response to control signals or synchronizing signals, and generates "in-band" words in response to video data. Each "in-band" word is an encoded word generated as a result of encoding one input video data word. All the words except for "in-band" words transmitted via the link are "out-of-band" words. The encoding of the video data is performed so that the transition of the "in-band" words may be minimized. In other words, the sequence of the "in-band" words has a reduced or minimum transition number. The encoding of video data is performed so that the "in-band" words are DC balanced. Encoding keeps the voltage wave which transfers a sequence of "in-band" words from going out of bound from between a reference voltage and a predetermined threshold voltage. In particular, the $10^{th}$ bit of each "in-band" word indicates whether 8-bits out of 9 other bits of the "in-band" word are inverted, and corrects unbalance between the previously encoded stream of data bits to the running counts of 1s and 0s.

The encoded video data and video clock signal are transferred as differential signals over pairs of conductors. In some embodiments, three pairs of conductors may be used to transmit the encoded video signal, and a fourth pair of conductors may be used to transmit a video clock signal. These signals may be transmitted in only one direction from the transmitter (e.g., a desk top, a portable computer, or other hosts) to the receiver (e.g., a monitor or other display device element).

The multimedia source 12 and the multimedia output device 14 may both be connected to a High Definition Multimedia Interface (HDMI). HDMI interfaces integrate video signal and audio signal into one digital interface, and are commonly used in audio/visual appliances such as, for example, DVD players, HDTVs, and set-top boxes. The High Bandwidth Digital Content Protection (HDCP) copy protection is adopted as the basis of HDMI. DVI is the key technology, and HDCP is a copyright protected invention which is a base band made by Intel Corporation. The HDCP requires a mutual verification between the devices as does the DTCP. The HDMI supports a standard to multi-channel audio signal, as well as standard, extended and HD video. The HDMI is capable of transmitting a non-compressed digital video signal of 5 gigabits per second as a single terminal, from a source device 12 to a display device 14.

Although the present invention has been described in connection with certain embodiments of the present invention that are illustrated in the accompanying drawings, the present invention is not limited to the embodiments pictured herein. Persons with skill in the art will recognize that embodiments of the present invention may be applied to other types of devices. The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of transmitting data from a multimedia source, the method comprising:
   generating a transmission clock signal that has a first frequency by multiplying a reference clock signal that has a second frequency that is different than the first frequency;
   multiplying the generated transmission clock signal to generate a pixel clock signal that has a third frequency that is different than the first and second frequencies; and
   outputting the transmission clock signal at the time serial data of the multimedia source is transmitted,
   wherein multiplying the generated transmission clock signal to generate the pixel clock signal that has the third frequency that is different than the first and second frequencies comprises:
   passing the generated transmission clock signal through a first multiplication path that includes at least one multiplier and/or divider circuit to generate a first potential pixel clock signal;
   passing the generated transmission clock signal through a second multiplication path that includes at least one multiplier and/or divider circuit to generate a second potential pixel clock signal; and
   generating the pixel clock signal by selecting one of the first potential pixel clock signal and the second potential pixel clock signal as the pixel clock signal based on a color depth of video data that is to be transmitted by the multimedia source.

2. The method of claim 1, wherein generating the transmission clock signal comprises:
   multiplying a reference clock signal using a phase-locked loop or a delay-locked loop to generate an intermediate clock signal having a fourth frequency; and
   dividing the intermediate clock signal having the fourth frequency by five to generate the transmission clock signal.

3. The method of claim 2, further comprising latching parallel data of the multimedia source to generate the serial data at a rising or a falling point of the intermediate clock signal.

4. The method of claim 1, wherein the third frequency of the pixel clock signal is ⅘, ⅔ or ½ the first frequency of the transmission clock signal.

5. The method of claim 4, wherein the third frequency of the pixel clock signal is ⅘ the first frequency of the transmission clock signal, and wherein the pixel clock signal is generated by passing the transmission clock signal through a divider that divides by five, a first frequency doubler and a second frequency doubler.

6. The method of claim 4, wherein the third frequency of the pixel clock signal is ⅔ the first frequency of the transmission clock signal, and wherein the pixel clock signal is generated by passing the transmission clock signal through a divider the divides by three and a frequency doubler.

7. The method of claim 4, wherein the third frequency of the pixel clock signal is ½ the first frequency of the transmission clock signal, and wherein the pixel clock signal is generated by passing the transmission clock signal through a divider the divides by two.

8. The method of claim 4, wherein the duty error of the pixel clock signal is correctable.

9. The method of claim 1, wherein the multimedia source generates a plurality of pixel clock signals, and wherein one of the plurality of pixel clock signals is selected for use by the multimedia source based on a color depth of the data of the multimedia source.

10. The method of claim 1, further comprising inputting the transmission clock signal and the pixel clock signal to a transmitter prior to outputting the transmission clock signal at the time serial data of the multimedia source is transmitted.

11. A method of transmitting data of a multimedia source, the method comprising:
    multiplying a reference clock signal having a first frequency to generate a transmission clock signal having a second frequency;
    multiplying the generated transmission clock signal to generate a pixel clock signal having a third frequency;
    converting parallel data into serial data in synchronization with the pixel clock signal; and
    transmitting the serial data and the transmission clock signal to an external device,
    wherein multiplying the generated transmission clock signal to generate the pixel clock signal having the third frequency comprises:
    passing the generated transmission clock signal through a first multiplication path that includes at least one multiplier and/or divider circuit to generate a first potential pixel clock signal;
    passing the generated transmission clock signal through a second multiplication path that includes at least one multiplier and/or divider circuit to generate a second potential pixel clock signal; and
    generating the pixel clock signal by selecting one of the first potential pixel clock signal and the second potential pixel clock signal as the pixel clock signal based on a color depth of video data that is to be transmitted by the multimedia source.

12. A method of generating a pixel clock signal for a multimedia source, the method comprising:
    generating a transmission clock signal having a first frequency from a reference clock signal that has a second frequency that is different than the first frequency;
    multiplying the generated transmission clock signal by a multiple to generate the pixel clock signal, and
    inputting the transmission clock signal and the pixel clock signal to a transmitter,
    wherein the pixel clock signal has a third frequency that is the product of the second frequency and the multiple,
    wherein multiplying the generated transmission clock signal by the multiple to generate the pixel clock signal comprises:
    passing the generated transmission clock signal through a first multiplication path that includes at least one multiplier divider circuit to generate a first potential pixel clock signal;
    passing the generated transmission clock signal through a second multiplication path that includes at least one multiplier and/or divider circuit to generate a second potential pixel clock signal; and generating the pixel clock signal by selecting one of the first potential pixel clock signal and the second potential pixel clock signal as the pixel clock signal based on a color depth of video data that is to be transmitted by the multimedia source.

13. The method of claim 12, wherein multiplying the generated transmission clock signal by the multiple to generate the pixel clock signal comprises passing the generated transmission clock signal through at least one divider and at least one frequency doubler to generate the pixel clock signal.

14. The method of claim 12, wherein multiplying the generated transmission clock signal by the multiple to generate the pixel clock signal further comprises:

passing the generated transmission clock signal through a third multiplication path that includes at least one multiplier and/or divider circuit to generate a third potential pixel clock signal; and wherein generating the pixel clock signal comprises selecting one of the first potential pixel clock signal, the second potential pixel clock signal and the third potential pixel clock signal as the pixel clock signal based on a color depth of video data that is to be transmitted by the multimedia source.

15. The method of claim 14, wherein the third frequency of the pixel clock signal is ⅘, ⅔ or ½ the first frequency of the transmission clock signal.

16. The method of claim 12, wherein a single phase locked loop or delay locked loop is used to generate the pixel clock signal from the reference clock signal.

17. The method of claim 16, wherein generating the transmission clock signal having the first frequency from the reference clock signal that has the second frequency comprises:

multiplying the reference clock signal using a multiplication unit to generate an intermediate clock signal; and dividing the intermediate clock signal using a divider to generate the transmission clock signal.

18. The method of claim 16, wherein generating the transmission clock signal having the first frequency from the reference clock signal that has the second frequency comprises:

dividing the reference clock signal using a divider to generate an intermediate clock signal; and multiplying the intermediate clock signal using a multiplication unit to generate the transmission clock signal.

19. The method of claim 17, wherein the single phase locked loop or delay locked loop is part of the multiplication unit.

* * * * *